United States Patent

Walters

[15] 3,673,512

[45] June 27, 1972

[54] SERVO AMPLIFIER

[72] Inventor: Ronnie G. Walters, Mayfield Heights, Ohio

[73] Assignee: Allen-Bradley Company, Milwaukee, Wis.

[22] Filed: Sept. 22, 1970

[21] Appl. No.: 74,427

[52] U.S. Cl. ................................330/97, 318/618, 318/621, 318/681, 330/107, 330/108, 330/109

[51] Int. Cl. ..........................................................H03f 1/36

[58] Field of Search ......................330/86, 97, 103, 108, 107, 330/109; 318/615, 618, 619, 621, 622, 677, 678, 681

[56] References Cited

UNITED STATES PATENTS 3,356,962 12/1967 Morgan.............................330/107 X 3,227,935 1/1966 Kawada ............................318/621 X 3,539,897 11/1970 Summeria.............................318/618

OTHER PUBLICATIONS

Crittenden, " Design T Feedback Networks with Ease," Electronic Design 14, July 5, 1969, pp. 64–68.

*Primary Examiner*—Roy Lake

*Assistant Examiner*—James B. Mullins

*Attorney*—Arnold J. Ericsen

[57] ABSTRACT

A servo amplifier is provided with associated circuitry which affords substantially independent compensation of both its frequency response and gain over the usable bandwidth whereby in a servo loop lead-lag compensation can be provided to establish desired output characteristics for the servo loop.

6 Claims, 3 Drawing Figures

INVENTOR
RONNIE G. WALTERS
BY
Lindenberg, Freilich & Wasserman
ATTORNEYS

SERVO AMPLIFIER

BACKGROUND OF THE INVENTION

This invention relates to an improved servo amplifier and more particularly to amplifiers having networks for providing the amplifier with desired output characteristics.

In most servo systems used in numerical machine control, some form of compensation is used, the object of which is to cause the forward loop of the servo and the process involved to have a frequency response closely approximating an integrator, over as wide a frequency range as possible. This permits a relatively wide bandwidth velocity loop with a high static accuracy. The wide bandwidth of the velocity loop is desirable since it permits higher position loop gain and consequently lower following error. Also, the mechanical output impedance of the servo drive is reduced. The following error is the difference between the commanded position of the machine tool and its actual position.

Generally, in actual practice two types of compensation methods are used. In the first method, externally applied combinations of resistances and capacitances are employed connected to the amplifier. These are varied until the desired performance is obtained, at which time the combination of resistance and capacitance yielding the desired performance is more or less permanently made a part of the amplifier. Another method uses potentiometers to alter the frequency response and gain of the servo amplifier. This method has the advantage of eliminating the need for externally applied components, however, frequency response and gain are usually highly interactive.

OBJECTS AND SUMMARY OF THE INVENTION

An object of this invention is to provide a servo amplifier whose frequency response is adjustable independently of its gain.

Another object of this invention is to provide a servo amplifier which is easily adjusted to provide a desired lead-lag compensation for the servo loop.

Yet another object of this invention is the provision of a servo amplifier with an associated adjustable network which enables one to obtain desired output characteristics very simply.

The foregoing and other objects of the invention are achieved in a servo amplifier having adjustable potentiometers at its input which enable control of the velocity loop gain and the position gain. A variable resistor is provided in one feedback network which affords DC gain control. A second feedback network includes variable resistors which afford lead and lag break point frequency control, or which enables one to determine the frequencies at which the gain of the amplifier changes.

DESCRIPTION OF THE PREFERRED EMBODIMENT

Figure 1:
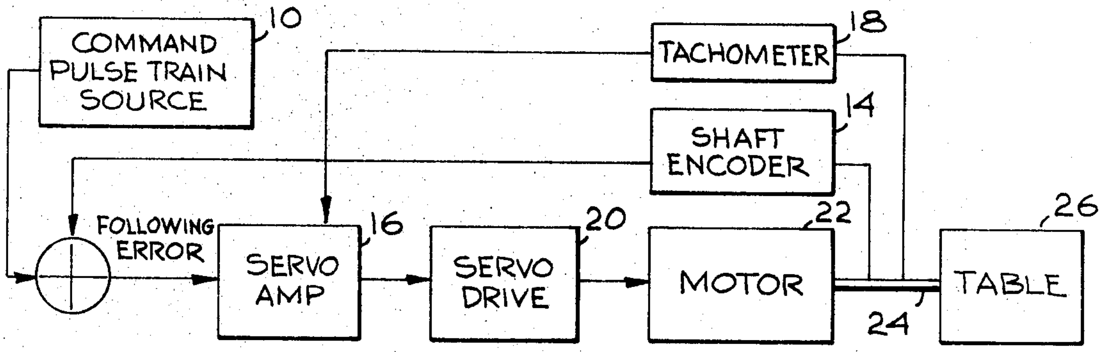
FIG. 1 is a block diagram of a servo loop for a numerically controlled machine tool illustrative of the environment in which this invention is employed.

FIG. 1 is a block schematic diagram shown to exemplify how this invention may be employed. The diagram shows the portion of a numerical machine tool control system which is used to drive the motor which moves the machine tool table on which a work piece rests. The arrangement shown is for only one axis, a similar arrangement is required for every other axis of motion for the machine tool.

Pulse trains from a command pulse train source 10 are applied to a summing circuit 12. The other input to the summing circuit, constituting pulses representing the motion response to the command pulse train, are applied from a shaft encoder 14. The shaft encoder indicates the response to the command pulse train. The output of the summer constitutes the following error and is applied as one input to the servo amplifier 16, which represents the amplifier, in accordance with this invention. A second input to the servo amplifier 16 is the output of a tachometer 18, constituting a voltage indicative of the velocity at which the table is being driven.

The output of the servo amplifier is applied to the servo drive circuits 20, which converts the signal received into a suitable form for driving the motor 22. The motor 22 drives an output shaft 24 which in turn moves the table 26. The tachometer 18 and the shaft encoder 14 are both coupled to be driven by the motor output shaft 24. The response of the motor to the drive signals applied thereto by the servo drive is not constant, but varies both with the input frequency and the input amplitude. The servo amplifier response in accordance with this invention is modified in an attempt to compensate principally for the motor response.

The loop which includes the tachometer, in FIG. 1 is known as the velocity loop and the loop which includes the shaft encoder is known as the position loop. This invention offers the ability to independently adjust the velocity and position loop gains, the advantages of which will be shown later.

Figure 2:
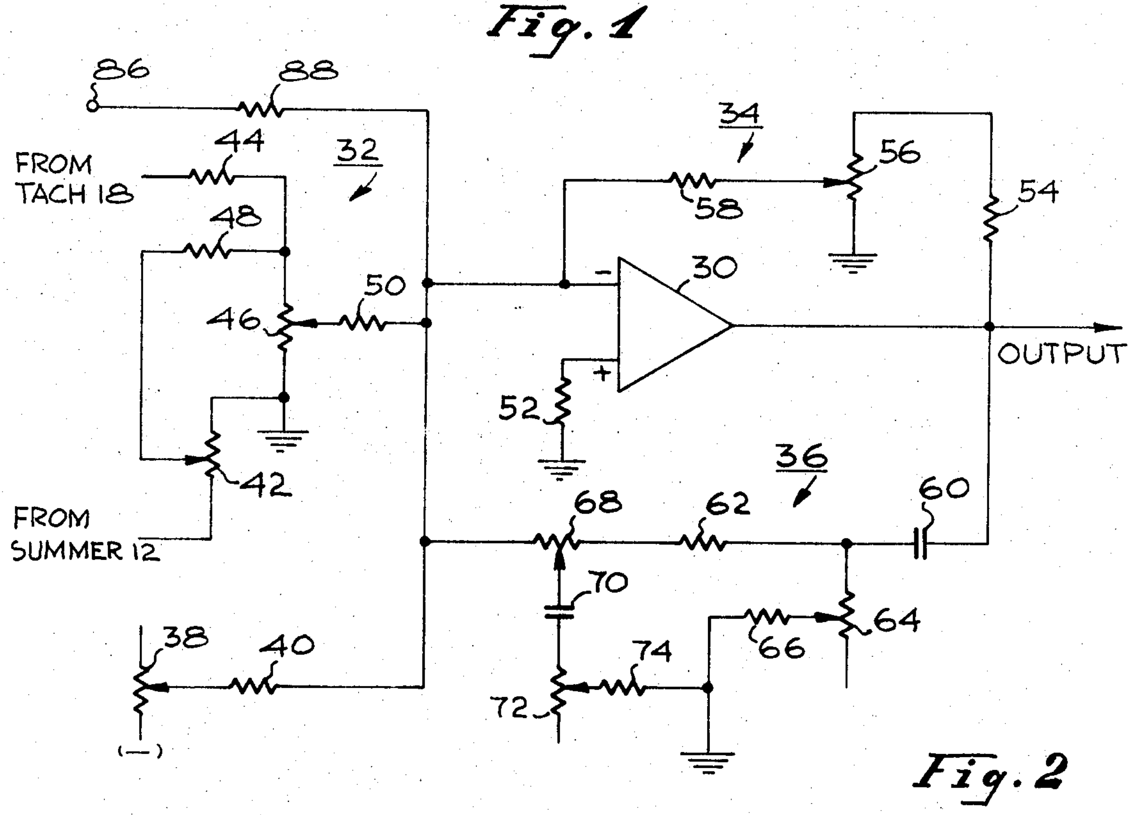
FIG. 2 is a circuit diagram of an embodiment of the invention.

FIG. 2 is a circuit diagram of an embodiment of the invention. An operational amplifier 30 is employed having an input network 32, together with a first feedback network 34, and a second feedback network 36. The input network 32 includes a zero level setting potentiometer 38 which is connected to the inverting input of the amplifier 30 through a resistor 40. This potentiometer is connected between a positive and negative potential source and is used to establish the output level of the amplifier in the absence of any input signals.

The feedback from the summing junction 12 is applied to one end of the potentiometer 42, the other end being grounded. The feedback from the tachometer 18 supplied through a resistor 44 to one end of potentiometer 46. The other end of the potentiometer is grounded or connected to a source of reference potential. The slider of potentiometer 42 is connected through resistor 48 to the ungrounded end of potentiometer 46. The slider of potentiometer 46 is connected through a resistor 50 to the inverting input of the amplifier 30.

Potentiometer 42 is used to determine the gain of the amplifier in response to the following error signals, also known as position feedback, and the setting of potentiometer 46 is also used to determine the gain of the amplifier in response to the velocity signals, also known as the velocity loop gain.

A resistor 52 is connected between the positive input terminal of the amplifier 30 and ground and usually serves to compensate for differential current offset in amplifier 30. The input network 32 is connected to the inverting input terminal of the amplifier 30.

A first feedback circuit 34 is a direct current feedback circuit and determines the DC gain of the amplifier. A resistor 54 connects the output of the amplifier to one end of the potentiometer 56, the other end of which is connected to ground. The slider of the potentiometer 56 is connected through a resistor 58 to the inverting input of the amplifier 30.

A second feedback network 36 includes a capacitor 60 having one side connected to the output of the amplifier and the other side connected to one end of a resistor 62 and to one end of a potentiometer 64. The slider of potentiometer 64 is connected through a resistor 66 to ground. Thus, potentiometer 64 is used as a variable resistor connected in series with the fixed resistor 66.

The other end of resistor 62 is connected to one side of a potentiometer 68. The other side of the potentiometer is connected to the inverting input of the amplifier 30. The slider of potentiometer 68 is connected through a capacitor 70 to one side of a potentiometer 72. The slider of potentiometer 72 is connected to ground through a fixed resistor 74. Thus, potentiometer 72 serves as a variable resistor connected in series with a fixed resistor 74.

Figure 3:
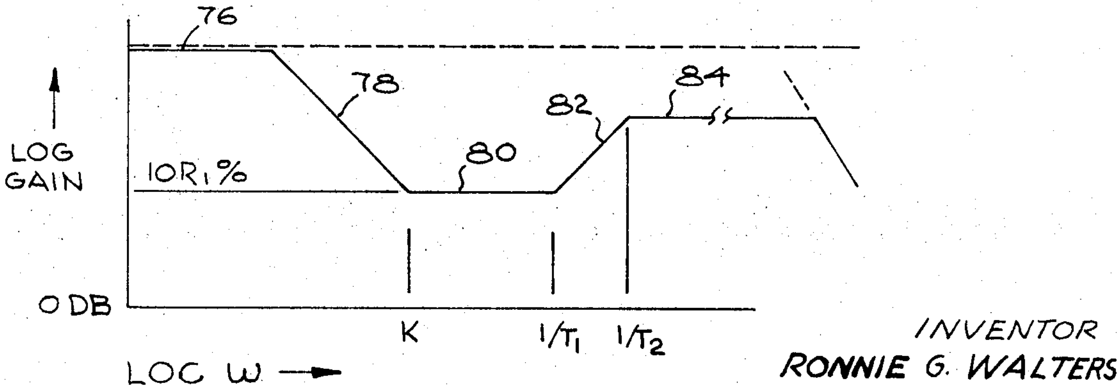
FIG. 3 is a curve illustrative of gain versus frequency characteristics achievable with this invention.

FIG. 3 is a plot wherein the logarithm of the gain are the ordinates and the logarithm of the frequency constitutes the abscissa. The curve shown in the drawing is illustrative of a characteristic for the amplifier for one particular setting of the potentiometers 46, 56, 72, 64 and 68. It will be appreciated that other characteristics may be obtained using other potentiometer settings. The gain of the amplifier starting with zero frequency and extending up to a desired break point designated as "1" is represented by the flat portion of the curve 76. At a predetermined break point the gain is reduced as the frequency increases, as represented by the sloping curve 78. The next break point designated as "2", introduces a flat gain versus increasing frequency, curve 80. This continues until the next break point, designated as "3", whereupon the curve is an upward slope 82, indicative of increasing gain with increasing frequency.

The last break point, designated as "4," introduces a flat gain versus increasing frequency curve 84. This flat portion extends until the limit of the operational amplifier 30 to handle the frequency reached occurs at which time there is a roll off of gain.

The break point frequencies at points 2, 3 and 4, may be varied independently by respectively adjusting potentiometers 64, 68 and 72.

Considering first the velocity loop, the amplifier has a transfer function of the form $$T_s \simeq \frac{G(S+K)(TS+1)}{S(T_2S+1)}$$

Where:

$$T_2 = (P_{72} + P_{74})\, C_{70}$$
$$T_1 = \text{Lead } \% \,(P_{68}\, C_{70})$$
$$K = 1/(\text{Lag } \% \, P_{66} + P_{64})\, C_{60}$$

By way of illustration and not to serve as a limitation on the invention, the following break frequencies were provided in an amplifier having circuit component values given below.

| Function | 0% | 100% |
|---|---|---|
| (2) Lag | 80 | 1.6 (Hz) |
| (3) Lead | ∞ | 1.6 (Hz) |
| (4) Lead-Limit | 7.2 | 80. |

By 0 percent and 100 percent in the Table it is intended to indicate the positions of the sliders of the potentiometers 64, 68, and 72. Potentiometer 64 controls the lag of setting of break point 2 and has its 100 percent position when the slider is at the unconnected end and is 0 position when the slider is at the end which is connected to capacitor 60.

| Resistors | Value-ohms | Potentiometers | Value-ohms | Capacitors |
|---|---|---|---|---|
| 88 | 10K | 72 | 10K | 70 – 2mf |
| 74 | 1K | 68 | 50K | 60 – 2mf |
| 66 | 1K | 64 | 50K | |
| 62 | 470K | 56 | 2K | |
| 58 | 500K | 46 | 1K | |
| 54 | 20K | 42 | 10K | |
| 52 | 10K | 38 | 50K | |
| 50 | 2.5K | | | |
| 48 | 10 K | | | |
| 44 | 20K | | | |
| 40 | 3.3M | | | |

Potentiometer 68 establishes the lead break point at position 3, and has its 0 location when the slider is closest to the side of the potentiometer connected to the input to the amplifier 30 and is at 100 percent position when the slider is at the other end of the potentiometer.

Potentiometer 72 establishes break point 4 which is designated as lead/limit break point and has its 0 position when the slider is at the unconnected side of the potentiometer resistor and its 100 percent position when the slider is at the other end of the potentiometer resistor which is connected to capacitor 70.

From the foregoing it may be seen that the break frequencies (2), (3), and (4), respectively shown as ($K$), ($1/T_1$) and ($1/T_2$), may be varied independently. In addition the gain at the middle flat portion of the response is unaffected by changes in frequency response when the location ($K$) is smaller than the frequency location $1/T_1$.

The validity of the approximations given rely on the fact that resistor 62 is much greater than the sum of resistors 66 and the value of the resistance of the potentiometer is 64 in series therewith and that the value of the resistance of potentiometer 68 is much smaller than the value of resistor 62.

The break frequency 1 is dependent upon the DC gain limit and break frequency 2, however, control of this break frequency, as such, would not normally be desired as the purpose of this break frequency is to provide a known upper limit on the low frequency gain in order to eliminate local small signal instabilities which often occur at low frequencies can sample data loops.

The bandwidth required of a velocity loop is primarily determined by the desired position loop gain. Any bandwidth in excess of this serves to decrease the mechanical output impedance of the prime mover and to increase static accuracy of the servo. For this reason, the velocity loop is set up first, with perhaps a very small amount of gain in the position loop (potentiometer 42), in order to prevent the position error from drifting some prohibitively large amount during set up of the velocity loop. At the outset, the Lead and Lag break frequencies are set at their extreme maximum and minimum values respectively, in addition the lead limit is set at maximum frequency. These settings are made with the potentiometers which have been indicated.

This provides an essentially flat response characteristic over the frequency range of interest. At this point, a square wave or some other suitable low frequency signal is applied to the test input terminal 86. The velocity loop gain (setting of potentiometer 46) is now increased to just below the point where instability occurs. This sets the 0 DB point of the system near 180° phase shift. The lead frequency (potentiometer 68) is now reduced until the instability disappears. This will permit a slight increase in velocity loop gain (potentiometer 46) before instability occurs again and potentiometers 68 and 46 are adjusted alternately in the manner until no further decrease in lead frequency can be attained. At this point the velocity loop bandwidth is at a maximum and the lead limit frequency (setting of potentiometer 72) may be decreased until instability again occurs and from this point it is again increased enough to return the system to a stable state. The lead limit, when adjusted in this manner reduces the gain at frequencies below the new 0 D.B. point in order to provide increased noise immunity. The velocity loop is now marginally stable at its maximum bandwidth. The Lag frequency (setting of potentiometer 64) may now be increased until the system again becomes unstable. This greatly increases the low frequency gain of the system at a small sacrifice in bandwidth. The velocity loop gain (setting of potentiometer 46) is now decreased until the loop is again stable and adequate gain and phase margin are obtained.

The test signal is now removed and the position loop gain (setting of potentiometer 42) is increased to the desired value. This does not alter the velocity loop frequency response at all. At this point, the velocity loop gain (position of potentiometer 46) may be again decreased if necessary, to improve stability of the position loop, assuming the velocity loop bandwidth was more than adequate to contain the desired position loop gain.

The primary advantage of being able to adjust the velocity loop gain independently of the position loop gain is that it permits one to readjust the gain and break frequencies slightly without altering the position loop gain (as when a fixed position gain is imposed). An additional advantage is had when it becomes necessary to match the responses two or more different servos, which happens in contouring applications. In such a situation, position loop gains are matched first and finally the velocity loop gains of the wider bandwidth loops may be reduced, degrading the velocity loop bandwidths to a level comparable with the response of the lowest bandwidth servo. This provides a high degree of matching between servos which is extremely difficult to achieve with interactive controls and virtually impossible to achieve by matching position gains alone.

From the foregoing, it will be seen that there has been described an amplifier which affords completely independent control of three break frequencies while maintaining a constant gain over the flat portions of the band pass of the amplifier, using only potentiometers. Further, each break frequency is adjustable over more than six octaves. Finally, the amplifier does not have interaction between position loop gain and velocity loop gain settings.

What is claimed is:

1. A servo amplifier comprising an amplifier having an input and an output,
first potentiometer means for applying two separate signals to said amplifier input,
a direct current feedback network connected between said amplifier input and output, and including a variable resistance means for adjusting the direct current gain of said amplifier,
an alternating current feedback network connected between said amplifier input and output, and including adjustable means for determining the gain of said amplifier over predetermined frequency ranges.

2. A servo amplifier as recited in claim 1 wherein said first potentiometer means includes a first potentiometer across which one of said two separate signals is applied,
a second potentiometer across which the other of said two separate signals is applied,
means for applying output of said first potentiometer across said second potentiometer, and
means for applying output of said second potentiometer to said amplifier input.

3. A servo amplifier as recited in claim 1 wherein said adjustable means in said alternating current feedback network comprises a serial branch connected between amplifier input and output and two shunt branches connected to said serial branch,
one of said two shunt branches including a first variable resistance means for establishing a first break frequency of said amplifier,
said serial branch including a second variable resistance for establishing a second break frequency of said amplifier, and
the other of said two shunt branches including a third variable resistor connected to said second variable resistor for establishing a third break frequency of said amplifier.

4. A servo amplifier as recited in claim 1 wherein said adjustable means in said alternating current feedback network includes three potentiometers each having a resistor and a slider moveable thereover,
means connecting the resistor of a first of said three potentiometers between the output and input of said amplifier,
a capacitor connecting the slider of said first of said three potentiometers to the resistor of a second of said three potentiometers,
means connecting the resistor of a third of said three potentiometers to the output of said amplifier, and
resistance means connecting the sliders of said second and third of said three potentiometers together.

5. A servo amplifier comprising an amplifier having an input and an output,
means for applying first and second signals to said input including a first potentiometer means across which said first signal is applied,
second potentiometer means across which said second signal is applied,
means for connecting output of said first potentiometer means across said second potentiometer means, and
means for applying output of said second potentiometer means to said amplifier input,
a direct current feedback network connected between said amplifier output and input, said direct current feedback network including third potentiometer means for adjusting the amount of direct current feedback, and
an alternating current feedback network connected between said amplifier output and input, said alternating current feedback means including variable resistance means for determining the gain of said amplifier at desired frequency locations.

6. A servo amplifier as recited in claim 5 wherein said alternating current feedback network includes a first capacitor having one side connected to said amplifier output,
a point of reference potential,
a first variable resistor means connected between the other side of said first capacitor and said point of reference potential, for establishing the gain of said amplifier at a first frequency,
a second variable resistor means connected between said other side of said first capacitor and the input of said amplifier, for establishing the gain of said amplifier at a second frequency, higher than said first frequency,
a second capacitor having one side connected to said second variable resistor means, and
a third variable resistor means connected between the other side of said second capacitor and said point of reference potential for establishing the gain of said amplifier at a third frequency higher than said second frequency.

* * * * *